United States Patent
Knoblach et al.

(10) Patent No.: US 9,658,618 B1
(45) Date of Patent: *May 23, 2017

(54) SYSTEMS AND APPLICATIONS OF LIGHTER-THAN-AIR (LTA) PLATFORMS

(71) Applicant: SPACE DATA CORPORATION, Chandler, AZ (US)

(72) Inventors: Gerald M. Knoblach, Chandler, AZ (US); Eric A. Frische, Sun Lakes, AZ (US); Bruce Alan Barkley, Phoenix, AZ (US)

(73) Assignee: SPACE DATA CORPORATION, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,036

(22) Filed: Feb. 15, 2017

Related U.S. Application Data (60) Continuation of application No. 15/366,020, filed on Dec. 1, 2016, which is a continuation-in-part of
(Continued)

(51) Int. Cl.
*G05D 1/00* (2006.01)
*G01S 19/13* (2010.01)
(Continued)

(52) U.S. Cl.
CPC ............ *G05D 1/0055* (2013.01); *B64B 1/46* (2013.01); *B64B 1/62* (2013.01); *G01S 19/13* (2013.01); *G07C 5/0808* (2013.01)

(58) Field of Classification Search
CPC .... B64B 1/40; B64B 1/44; B64B 1/46; B64B 1/70; G01S 5/12; G01S 5/06; G01S 19/42; G01S 19/24; G05D 1/0055; G07C 5/0808
(Continued)

(56) References Cited

U.S. PATENT DOCUMENTS

| 2,151,336 A | 3/1939 | Scharlau |
| 2,366,423 A | 1/1945 | Pear, Jr. |

(Continued)

FOREIGN PATENT DOCUMENTS

| DE | 1188951 | 3/1965 |
| EP | 0837567 A2 | 4/1998 |

(Continued)

OTHER PUBLICATIONS

Part 101—Moored Balloons, Kites, Umanned Rockets and Unmmaned Free Balloons, Federal Aviation Administration, Dept. of Tranportation, 14 CFR Ch. 1, Jan. 1, 1999 Edition, pp. 304-308.
(Continued)

*Primary Examiner* — Tan Q Nguyen
(74) *Attorney, Agent, or Firm* — Pillsbury Winthrop Shaw Pittman LLP (57) ABSTRACT

Innovative new systems and method of operating the systems, wherein the system comprises an airborne platform comprising an unmanned balloon; a payload that is separate from the unmanned balloon; a transceiver; a flight termination device; at least two separate power sources; a sensor; a processor; a pump; a valve; and an object that when broken separates the unmanned balloon and the payload, are disclosed herein.

28 Claims, 7 Drawing Sheets

Related U.S. Application Data application No. 14/473,691, filed on Aug. 29, 2014, now Pat. No. 9,519,045, which is a division of application No. 13/757,585, filed on Feb. 1, 2013, now Pat. No. 8,825,232, which is a division of application No. 12/099,004, filed on Apr. 7, 2008, now abandoned, which is a division of application No. 10/673,474, filed on Sep. 30, 2003, now Pat. No. 7,356,390, which is a continuation of application No. 10/129,666, filed as application No. PCT/US02/12228 on Apr. 18, 2002.

(60) Provisional application No. 60/284,799, filed on Apr. 18, 2001.

(51) Int. Cl.
*B64B 1/46* (2006.01)
*B64B 1/62* (2006.01)
*B65B 1/44* (2006.01)
*G07C 5/08* (2006.01)

(58) Field of Classification Search
USPC .................................. 701/5, 4, 2; 244/75.1
See application file for complete search history.

(56) References Cited

U.S. PATENT DOCUMENTS

| | | | |
|---|---|---|---|
| 2,462,102 A | 2/1949 | Istvan |
| 2,542,823 A | 2/1951 | Lyle |
| 2,598,064 A | 5/1952 | Lindenblad |
| 2,626,348 A | 1/1953 | Nobles |
| 3,030,500 A | 4/1962 | Katzin |
| 3,030,509 A | 4/1962 | Carlson |
| 3,045,952 A | 7/1962 | Underwood |
| 3,058,694 A | 10/1962 | Fazio et al. |
| 3,174,705 A | 3/1965 | Chiff et al. |
| 3,206,749 A | 9/1965 | Chatelain |
| 3,384,891 A | 5/1968 | Anderson |
| 3,404,278 A | 10/1968 | Chope |
| 3,471,856 A | 10/1969 | Laughlin, Jr. et al. |
| 3,555,552 A | 1/1971 | Alford |
| 3,674,225 A | 7/1972 | Johnson |
| 3,742,358 A | 6/1973 | Cesaro |
| 3,781,893 A | 12/1973 | Beukers et al. |
| 3,781,894 A | 12/1973 | Ancona et al. |
| RE28,725 E | 2/1976 | Hutchinson et al. |
| 4,123,987 A | 11/1978 | Singerle et al. |
| 4,249,181 A | 2/1981 | Lee |
| 4,262,864 A | 4/1981 | Eshoo |
| 4,394,780 A | 7/1983 | Mooradian |
| 4,419,766 A | 12/1983 | Goeken et al. |
| 4,457,477 A | 7/1984 | Regipa |
| 4,472,720 A | 9/1984 | Reesor |
| 4,481,514 A | 11/1984 | Beukers et al. |
| 4,509,053 A | 4/1985 | Robin et al. |
| 4,509,851 A | 4/1985 | Ippolito et al. |
| 4,589,093 A | 5/1986 | Ippolito et al. |
| 4,595,928 A | 6/1986 | Wingard |
| 4,689,739 A | 8/1987 | Federico et al. |
| 4,696,052 A | 9/1987 | Breeden |
| 4,740,783 A | 4/1988 | Lawrence et al. |
| 4,747,160 A | 5/1988 | Bossard |
| 4,868,577 A | 9/1989 | Wingard |
| 4,979,170 A | 12/1990 | Gilhousen et al. |
| 4,995,572 A | 2/1991 | Piasecki |
| 5,005,513 A | 4/1991 | Van Patten et al. |
| 5,067,172 A | 11/1991 | Schloemer |
| 5,119,397 A | 6/1992 | Dahlin et al. |
| 5,121,128 A | 6/1992 | van Lidth de Jeude et al. |
| 5,123,112 A | 6/1992 | Choate |
| 5,175,556 A | 12/1992 | Berkowitz |
| 5,189,734 A | 2/1993 | Bailey et al. |
| 5,204,970 A | 4/1993 | Stengel et al. |
| 5,212,804 A | 5/1993 | Choate |
| 5,214,789 A | 5/1993 | George |
| 5,218,366 A | 6/1993 | Cardamone et al. |
| 5,235,633 A | 8/1993 | Dennison et al. |
| 5,239,668 A | 8/1993 | Davis |
| 5,287,541 A | 2/1994 | Davis et al. |
| 5,327,572 A | 7/1994 | Freeburg |
| 5,345,448 A | 9/1994 | Keskitalo |
| 5,384,565 A | 1/1995 | Cannon |
| 5,420,592 A | 5/1995 | Johnson |
| 5,430,656 A | 7/1995 | Dekel et al. |
| 5,433,726 A | 7/1995 | Horstein et al. |
| 5,439,190 A | 8/1995 | Horstein et al. |
| 5,444,762 A | 8/1995 | Frey et al. |
| 5,455,823 A | 10/1995 | Noreen et al. |
| 5,467,681 A | 11/1995 | Liberman |
| 5,471,641 A | 11/1995 | Dosiere et al. |
| 5,488,648 A | 1/1996 | Womble |
| 5,519,761 A | 5/1996 | Gilhousen |
| 5,521,817 A | 5/1996 | Burdoin et al. |
| 5,533,029 A | 7/1996 | Gardner |
| 5,557,656 A | 9/1996 | Ray et al. |
| 5,559,865 A | 9/1996 | Gilhousen |
| 5,584,047 A | 12/1996 | Tuck |
| 5,615,409 A | 3/1997 | Forssen et al. |
| 5,645,248 A | 7/1997 | Campbell |
| 5,714,948 A | 2/1998 | Farmakis et al. |
| 5,745,685 A | 4/1998 | Kirchner et al. |
| 5,748,620 A | 5/1998 | Capurka |
| 5,759,712 A | 6/1998 | Hockaday |
| 5,761,656 A | 6/1998 | Ben-Shachar |
| 5,781,739 A | 7/1998 | Bach et al. |
| 5,788,187 A | 8/1998 | Castiel et al. |
| 5,832,380 A | 11/1998 | Ray et al. |
| 5,835,059 A | 11/1998 | Nadel et al. |
| 5,870,549 A | 2/1999 | Bobo |
| 5,899,975 A | 5/1999 | Nielsen |
| 5,907,949 A | 6/1999 | Falke et al. |
| 5,909,299 A | 6/1999 | Sheldon, Jr. et al. |
| 5,960,200 A | 9/1999 | Eager et al. |
| 5,963,128 A | 10/1999 | McClelland |
| 5,978,940 A | 11/1999 | Newman et al. |
| 5,987,432 A | 11/1999 | Zusman et al. |
| 5,992,795 A | 11/1999 | Tockert |
| 5,996,001 A | 11/1999 | Quarles et al. |
| 6,061,562 A | 5/2000 | Martin et al. |
| 6,067,579 A | 5/2000 | Hardman et al. |
| 6,097,688 A | 8/2000 | Ichimura et al. |
| 6,108,673 A | 8/2000 | Brandt et al. |
| 6,128,622 A | 10/2000 | Bach et al. |
| 6,141,660 A | 10/2000 | Bach et al. |
| 6,167,263 A | 12/2000 | Campbell |
| 6,212,550 B1 | 4/2001 | Segur |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,289,382 B1 | 9/2001 | Bowman-Amuah |
| 6,324,398 B1 | 11/2001 | Lanzerotti et al. |
| 6,397,253 B1 | 5/2002 | Quinlan et al. |
| 6,401,136 B1 | 6/2002 | Britton et al. |
| 6,414,947 B1 | 7/2002 | Legg et al. |
| 6,446,110 B1 | 9/2002 | Lection et al. |
| 6,507,856 B1 | 1/2003 | Chen et al. |
| 6,507,857 B1 | 1/2003 | Yalcinalp |
| 6,510,466 B1 | 1/2003 | Cox et al. |
| 6,519,617 B1 | 2/2003 | Wanderski et al. |
| 6,529,921 B1 | 3/2003 | Berkowitz et al. |
| 6,530,078 B1 | 3/2003 | Shmid et al. |
| 6,535,896 B2 | 3/2003 | Britton et al. |
| 6,543,343 B2 | 4/2003 | Taylor |
| 6,560,639 B1 | 5/2003 | Dan et al. |
| 6,568,631 B1 | 5/2003 | Hillsdon |
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |

(56) References Cited

U.S. PATENT DOCUMENTS

| | | |
|---|---|---|
| 6,615,383 B1 | 9/2003 | Talluri et al. |
| 6,628,941 B2 | 9/2003 | Knoblach et al. |
| 6,643,825 B1 | 11/2003 | Li et al. |
| 6,665,861 B1 | 12/2003 | Francis et al. |
| 6,668,354 B1 | 12/2003 | Chen et al. |
| 6,687,873 B1 | 2/2004 | Ballantyne et al. |
| 6,697,849 B1 | 2/2004 | Carlson |
| 6,728,685 B1 | 4/2004 | Ahluwalia |
| 6,738,975 B1 | 5/2004 | Yee et al. |
| 6,753,889 B1 | 6/2004 | Najmi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,810,429 B1 | 10/2004 | Walsh et al. |
| 6,816,883 B2 | 11/2004 | Baumeister et al. |
| 6,826,696 B1 | 11/2004 | Chawla et al. |
| 6,850,979 B1 | 2/2005 | Saulpaugh et al. |
| 6,859,834 B1 | 2/2005 | Arora et al. |
| 6,874,146 B1 | 3/2005 | Iyengar |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,910,216 B2 | 6/2005 | Abileah et al. |
| 6,912,719 B2 | 6/2005 | Elderon et al. |
| 6,915,523 B2 | 7/2005 | Dong et al. |
| 6,948,117 B2 | 9/2005 | Van Eaton et al. |
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankireddipally et al. |
| 6,980,963 B1 | 12/2005 | Hanzek |
| 6,980,993 B2 | 12/2005 | Horvitz et al. |
| 7,000,238 B2 | 2/2006 | Nadler et al. |
| 7,013,306 B1 | 3/2006 | Turba et al. |
| 7,043,687 B2 | 5/2006 | Knauss et al. |
| 7,051,032 B2 | 5/2006 | Chu-Carroll et al. |
| 7,054,901 B2 | 5/2006 | Shafer |
| 7,058,955 B2 | 6/2006 | Porkka |
| 7,069,291 B2 | 6/2006 | Graves et al. |
| 7,080,092 B2 | 7/2006 | Upton |
| 7,093,789 B2 | 8/2006 | Barocela et al. |
| 7,107,285 B2 | 9/2006 | von Kaenel et al. |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,181,493 B2 | 2/2007 | English et al. |
| 7,266,582 B2 | 9/2007 | Stelting |
| 7,296,226 B2 | 11/2007 | Junkermann |
| 7,341,223 B2 | 3/2008 | Chu |
| 7,398,221 B1 | 7/2008 | Bensoussan et al. |
| 7,418,508 B2 | 8/2008 | Haller et al. |
| 7,421,701 B2 | 9/2008 | Dinh et al. |
| 7,487,936 B2 | 2/2009 | Heaven |
| 7,567,779 B2 | 7/2009 | Seligsohn et al. |
| 7,590,987 B2 | 9/2009 | Behrendt et al. |
| 7,801,522 B2 * | 9/2010 | Knoblach et al. ........ B64B 1/40 455/431 |
| 8,286,910 B2 | 10/2012 | Alavi |
| 2001/0004583 A1 | 6/2001 | Uchida |
| 2001/0014900 A1 | 8/2001 | Brauer et al. |
| 2001/0016869 A1 | 8/2001 | Baumeister et al. |
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2001/0047311 A1 | 11/2001 | Singh |
| 2002/0010716 A1 | 1/2002 | McCartney et al. |
| 2002/0031101 A1 | 3/2002 | Petite et al. |
| 2002/0035583 A1 | 3/2002 | Price et al. |
| 2002/0038335 A1 | 3/2002 | Dong et al. |
| 2002/0038336 A1 | 3/2002 | Abileah et al. |
| 2002/0042849 A1 | 4/2002 | Ho et al. |
| 2002/0046294 A1 | 4/2002 | Brodsky et al. |
| 2002/0049815 A1 | 4/2002 | Dattatri |
| 2002/0052968 A1 | 5/2002 | Bonefas et al. |
| 2002/0056012 A1 | 5/2002 | Abileah et al. |
| 2002/0059344 A1 | 5/2002 | Britton et al. |
| 2002/0078010 A1 | 6/2002 | Ehrman et al. |
| 2002/0078255 A1 | 6/2002 | Narayan |
| 2002/0083099 A1 | 6/2002 | Knauss et al. |
| 2002/0099735 A1 | 7/2002 | Schroeder et al. |
| 2002/0100027 A1 | 7/2002 | Binding et al. |
| 2002/0107915 A1 | 8/2002 | Ally et al. |
| 2002/0111989 A1 | 8/2002 | Ambler et al. |
| 2002/0116454 A1 | 8/2002 | Dyla et al. |
| 2002/0133569 A1 | 9/2002 | Huang et al. |
| 2002/0143820 A1 | 10/2002 | Van Eaton et al. |
| 2002/0156930 A1 | 10/2002 | Velasquez |
| 2002/0160745 A1 | 10/2002 | Wang |
| 2002/0160805 A1 | 10/2002 | Laitinen et al. |
| 2002/0161801 A1 | 10/2002 | Hind et al. |
| 2002/0174340 A1 | 11/2002 | Dick et al. |
| 2002/0175243 A1 | 11/2002 | Black et al. |
| 2002/0178031 A1 | 11/2002 | Sorensen et al. |
| 2002/0178290 A1 | 11/2002 | Coulthard et al. |
| 2002/0178299 A1 | 11/2002 | Teubner |
| 2002/0188688 A1 | 12/2002 | Bice et al. |
| 2002/0194227 A1 | 12/2002 | Day et al. |
| 2002/0198974 A1 | 12/2002 | Shafer |
| 2003/0004746 A1 | 1/2003 | Kheirolomoom et al. |
| 2003/0007397 A1 | 1/2003 | Kobayashi et al. |
| 2003/0040273 A1 | 2/2003 | Seligsohn et al. |
| 2003/0040955 A1 | 2/2003 | Anaya et al. |
| 2003/0046035 A1 | 3/2003 | Anaya et al. |
| 2003/0055768 A1 | 3/2003 | Anaya et al. |
| 2003/0065623 A1 | 4/2003 | Cornell et al. |
| 2003/0070006 A1 | 4/2003 | Nadler et al. |
| 2003/0074217 A1 | 4/2003 | Beisiegel et al. |
| 2003/0078902 A1 | 4/2003 | Leong et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0097327 A1 | 5/2003 | Anaya et al. |
| 2003/0120730 A1 | 6/2003 | Kuno et al. |
| 2003/0126229 A1 | 7/2003 | Kantor et al. |
| 2003/0131142 A1 | 7/2003 | Horvitz et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167223 A1 | 9/2003 | Pledereder et al. |
| 2003/0191970 A1 | 10/2003 | Devine et al. |
| 2003/0204460 A1 | 10/2003 | Robinson et al. |
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0054969 A1 | 3/2004 | Chiang et al. |
| 2004/0064466 A1 | 4/2004 | Manikutty et al. |
| 2004/0103370 A1 | 5/2004 | Chiang et al. |
| 2004/0111464 A1 | 6/2004 | Ho et al. |
| 2004/0205536 A1 | 10/2004 | Newman et al. |
| 2004/0205731 A1 | 10/2004 | Junkermann |
| 2004/0205770 A1 | 10/2004 | Zhang et al. |
| 2004/0210469 A1 | 10/2004 | Jones et al. |
| 2004/0221292 A1 | 11/2004 | Chiang et al. |
| 2004/0230987 A1 | 11/2004 | Snover et al. |
| 2004/0237034 A1 | 11/2004 | Chiang et al. |
| 2005/0050228 A1 | 3/2005 | Perham et al. |
| 2005/0091639 A1 | 4/2005 | Patel |
| 2005/0165826 A1 | 7/2005 | Ho et al. |
| 2005/0165936 A1 | 7/2005 | Haller et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |

(56) References Cited

U.S. PATENT DOCUMENTS

| | | | |
|---|---|---|---|
| 2005/0258306 A1 | 11/2005 | Barocela et al. | |
| 2005/0278410 A1 | 12/2005 | Espino | |
| 2006/0063529 A1 | 3/2006 | Seligsohn et al. | |
| 2006/0265478 A1 | 11/2006 | Chiang et al. | |
| 2007/0083524 A1 | 4/2007 | Fung et al. | |
| 2007/0094283 A1 | 4/2007 | Fung et al. | |
| 2008/0263641 A1 | 10/2008 | Dinh et al. | |
| 2008/0271049 A1 | 10/2008 | Dinh et al. | |
| 2008/0299990 A1* | 12/2008 | Knoblach et al. | B64B 1/40 455/456.1 |
| 2009/0189015 A1 | 7/2009 | Alavi | |
| 2014/0367511 A1* | 12/2014 | Knoblach et al. | B64B 1/40 244/97 |

FOREIGN PATENT DOCUMENTS

| | | |
|---|---|---|
| EP | 1058409 | 12/2000 |
| EP | 1327580 | 7/2003 |
| GB | 2216319 | 10/1989 |
| JP | 950826 | 2/1997 |
| JP | 2001273177 | 10/2001 |
| WO | WO9504407 | 2/1995 |
| WO | WO9602094 | 1/1996 |
| WO | WO9851568 A1 | 11/1998 |
| WO | WO0101710 | 1/2001 |
| WO | WO 01/58098 | 8/2001 |
| WO | WO0167290 | 9/2001 |

OTHER PUBLICATIONS

Part 101—Moored Balloons, Kites, Umanned Rockets and Unmmaned Free Balloons, Federal Aviation Administration, Dept. of Tranportation, 14 CFR Ch. 1, Jan. 1, 2000 Edition, pp. 309-313.
Part 101—Moored Balloons, Kites, Umanned Rockets and Unmmaned Free Balloons, Federal Aviation Administration, Dept. of Tranportation, 14 CFR Ch. 1, Jan. 1, 2001 Edition, pp. 307-311.
Non-Final Office Action issued Feb. 14, 2017 in corresponding U.S. Appl. No. 15/351,441.
Brazillian Written Opinion mailed Jan. 3, 2017 in corresponding Brazillian Patent Application No. PI0414906-8.
"Attunity Connect for Mainframe, Native OS/390 Adapters to Data and Legacy," 2003, pp. 1-3.
"Connecting to IMS Using XML, Soap and Web Services", Shyh-Mei F. Ho. IMS Technical Conference, Koenigswinter, Germany, Oct. 15-17, 2002.
"Correlate IMSADF Secondary Transaction MFS Generation with the Generation of the Output Format Rule", IBM Technical Disclosure Bulletin, vol. 27, No. 1B, pp. 623-624, Jun. 1984.
"Creating WSDL and a Proxy Client From a Web Service," www.west-wind.com/webconnection/docs/_08413NI2E.htm, 2002.
"HostBridge and WebSphere: Integrating CICS with IBM's Application Server," a HostBridge White Paper, Jul. 23, 2002, pp. 1-34.
"IBM Mainframe," www.dmreview.com/whitepaper/WID1002720.pdf, Mar. 18, 2005.
"IMS Connect Guide and Reference version 1," http://publibfp.boulder.ibm.com/epubs/pdf/icgr0001.pdf, Oct. 2000, IBM.
"IMS Connect Guide and Reference", IBM et al. http://publibfp.boulder.ibm.com/epubs/pdf/hwsuga11.pdf, Oct. 2002.
"IMS Connector for Java, User's Guide and Reference", IBM VisualAge for Java, Version 3.5, 9 pages, IBM.
"IMS Follow-on Ideal for e-business", Excerpts from http://www.3.ibm.com/software/data/ims/...ntations/two/imsv7enh/HTML/indexp54.htm, IBM Corporation, 2002.
"IMS Information", Excerpts from http://www.3.ibm.com/software/data/ims/...ntatlons/two/imsv7enh/HTML/indexp55.htm, IBM Corporation. 2002.
"Learning Management Systems XML and Web Services," Finn Gronbaek, IBM Corporation, copyright 2001, Apr. 20, 2003, pp. 1-29.

"Leveraging IMS Applications and Data"< Excerpts from Leveraging IMS2 found at http://www.3.ibm.com/software/data/ims/...ntations/tow/imsv7enh/HTML/indexp52.htm, IBM Corporation, 2002.
"MFS XML Utility Version 9.3.0 User's Guide and REference", 57 pages, IBM Corporation, ftp://ftp.software.ibm.com/software/data/ims/toolkit/mfswebsupport/mfsxml-v3.pdf, 2003.
"NetDynamics, PAC for IMS" User Guide, Precise Connectivity Systems, 1998.
"Quarterdeck Mosiac User Guide," 1995, Chapters 1-7.
"Remote Execution of IMS Transactions for OS/2", IBM Technical Disclosure Bulletin, vol. 34, No. 7B, pp. 16, Dec. 1991.
"Requirements for Building Industrial Strength Web Services: The Service Broker", http:www.theserverside.com/Warticles.tss?1=Service-Broker Jul. 2001.
"S1215, www.ims or Websphere Working with IMS," Ken Blackman, 39 pp. (date unknown).
"Web Services Description Language (WSDL) 1." Mar. 2001, W3C.
"Web Services", www.webopedia.com/TERM/W/Web services.html, 2003.
"Web Services—The Next Step in the Evolution of the Web", Excerpt from http://www.3.ibm.com/software/data/ims/...ntations/two/imsv7enh/HTML/indexp51.htm, IBM Corporation, 2002.
"What Web Services Are Not", www.webreference.com/xml/column50, 2003.
"What's Next in IMS Providing Integrated e-business Solutions: IMS Version 8," Excerpt from http://www.3.ibm.com/software/data/ims/...ntations/two/imsv7enh/HTML/indexp53.htm, IBM Corporation, 2002.
"XML and IMS for Transparent Application Integration", Excerpt from http://www.3.ibm.com/software/data/ims/...ntations/two/imsv7enh/HTML/indexp50.htm, IBM Corporation, 2002.
"XML Schema Part 2: Datatypes" 2001, W3C <http://www.w3.org/TR/2001/PR-xmischema-2-20010330>.
Application Development/Enablement, http://www.306.ibm.com/software/data/ims/presentation/five/trends2003/HTML/indexp15.htm, Oct. 11, 2003.
Arndt et al., An XML-Based Approach to Multimedia Software Engineering for Distance Learning, ACM 2002, pp. 525-532.
Blackman, "IMS eBusiness Update", IMS V8 Roadshow, 11 pages, IBM Corporation, http://www-306ibm.com.software/data/ims/shelf/presentation/oneday/IMSeBusinessUpdate2003.pdf, 2003.
Component of the Week: XMI Toolkit:, Jun. 1, 2001 http://www-106.ibm.com/developerworks/library/co-cow21. htm l.
Cover et al., "Web Services User Interface (WSUI) Initiative", http://xml.coverpages.org/wsui.html, Oct. 29, 2002.
Cover, Robin et al. Web Services for Interactive Applications (WSIA). [Web Services Component Model (WSCM)], http://xml.coverpages.org/wscm, Jan. 21, 2002, printed Oct. 31, 2007, 4 pages.
Cronje, "Absa Uses VGR to Ensure Online Availability", www-306.ibm.com/software/data/ims/quarterly/Winter2000/winter.htm.
Crouch et al., "Balloon and Airship" Compton's Interactive Encyclopedia, 5 pages excerpt, 1993-1994.
David A. Brown "Balloon Technology Offers High-Altitude Applications" Aviation Week & Space Technology, Nov. 16, 1992, pp. 56-57.
Diaz et al., Inter-Organizational Document Exchange—Facing the Conversion Problem with XML, ACM 2002, pp. 1043-104.
Djuknic, G. M. et al. (1997) "Establishing Wireless Communications Services via High-Altitude Aeronautical Platforms: A Concept Whose Time Has Come?," IEEE Communictions Magazine 35(9): 128-135.
Dymetman at al., XML and Multilingual Document Authoring: Convergent Trends, ACM Jul. 2000, pp. 243-249.
Extended European Search Report mailed on Aug. 1, 2006, for patent application No. 0502604035, 7 pages
Extensible Markup Language (XML) 1.0 (Second Edition) Oct. 2000, W3C.
Gavan, J. (1996) "Stratospheric Quasi-Stationary Platforms: (SQ-SP) Complementary toRadio Satellite Systems," Electrical and Electronics Engineers in Israel, 1996, Nineteenth Convention of 283-286.

(56) References Cited

OTHER PUBLICATIONS

Glushko et al., An XML Framework for Agent-Based E-Commerce, ACM Mar. 1999, pp. 106-114.
Google Search for IMS OnDemand SOA IMS MFS Web Solution [retrieved Dec. 17, 2009 at http://www.google.com/search?hl=en$source=hp&q=MFS+MID+MOD+DIF+DOF&aq . . . ].
Hase, Y. et al. (1998) "A Novel Broadband All Wireless Access Network Using Stratospheric Plaforms" VTC 1191-1194.
Hofstetter, The Future's Future: Implications of Emerging Technology for Special Education Program Planning, Journal of Special Education Technology, Fall 2001, vol. 16, p. 7, 7 pgs.
Huang et al., Design and Implementation of a Web-based HL7 Message Generation and Validation System, Google 2003, pp. 49-58.
James Martin, "Principles of Object-Oriented Analysis and Design," Oct. 29, 1992, Chapters 1-22.
Jantti, Jouko et al., "Solutions for IMS Connectivity", http://www-1.ibm.com/support/docsview.wss?uid=swg27009024&aid=1, Feb. 2006.
Jouko Jantti et al., "IMS Version 9 Implementation Guide", ibm.com/redbooks, pp. 139-143.
Long et al. "IMS Primer"Jan. 2000, IBM, Chapter 18.
Microfocus International "DBD, PSB and MFS Statements," 2001, available at <http://supportline, microfocus.com/documentation/books/mx25sp1/imdbds.htm> as of Jun. 16, 2009.
Microsoft Corp, Computer Dictionary, Third Edition, Microsoft Press, 1997, p. 371.
Mraz, Stephen J. (1998) "Nanosatellites Head for the Launch Pad" Machine Design 70(13):38, 42, 44, 46.
Office Action from U.S. Patent and Trademark Office for U.S. Appl. No. 12/168,451, received May 10, 2011.
Office Action from U.S. Patent and Trademark Office for U.S. Appl. No. 12/169,486, received Feb. 1, 2012.
OMG XML Metadata Interchange (XMI) Specification, Jun. 2000, OMG, v1.0.
Parr et al., Distributed Processing Involving Personal Computers and Mainframe Hosts, IEEE 1985, pp. 479-489.
PR Newswire, Sterling Commerce Announces Availability of First Data Transformation Engine to Support Both XML and Traditional EDI Standards, ProQuest May 12, 1999, pp. 1-3.
PR Newswire, XMLSolutions Delivers XML-based Prototype for Envera Marketplace, ProQuest, Apr. 2000, pp. 1-3.
Royappa, Implementing Catalog Clearinghouses with XML and XSL, ACM 1998, pp. 616-623.
Starkey, "XML-Based Templates for Generating Artifacts from Java-Based Models," Research Disclosure, Dec. 1998, pp. 1678-1680.
Stieren, SST: Using Single-sourcing, SGML, and Teamwork for Documentation, ACM 1999, pp. 45-52.
Suzuki et al., Managing the Software Design Documents with XML, ACM 1999, pp. 127-136.
UMLTM for EAI. UMLTM Profile and Interchange Models for Enterprise Application Integration (EAI). OMG document No. ad/2001-09-17.
Wong, Web services and Enterprise Application Integration, Google Jun. 2002, pp. 1-57.

\* cited by examiner

FRONT VIEW

FIG.6

SIDE VIEW

FIG.7

END VIEW

SYSTEMS AND APPLICATIONS OF LIGHTER-THAN-AIR (LTA) PLATFORMS

RELATED APPLICATIONS

This Application is a Continuation of U.S. patent application Ser. No. 15/366,020, filed Dec. 1, 2016 (now allowed), which is a Continuation-In-Part of U.S. patent application Ser. No. 14/473,691, filed Aug. 29, 2014 (now U.S. Pat. No. 9,519,045, issued Dec. 13, 2016), which is a Divisional of U.S. patent application Ser. No. 13/757,585, filed Feb. 1, 2013 (now U.S. Pat. No. 8,825,232, issued Sep. 2, 2014), which is a Divisional of U.S. patent application Ser. No. 12/099,004, filed Apr. 7, 2008 (now abandoned), which is a Divisional of U.S. patent application Ser. No. 10/673,474, filed Sep. 30, 2003 (now U.S. Pat. No. 7,356,390, issued Apr. 8, 2008), which is a Continuation-In-Part of U.S. patent application Ser. No. 10/129,666, filed May 9, 2002 (now U.S. Pat. No. 7,203,491, issued Apr. 10, 2007), filed as National Stage of PCT/US02/12228 filed Apr. 18, 2002, which claims benefit to U.S. Provisional Application No. 60/284,799 filed Apr. 18, 2001; the contents of all of which are incorporated herein in their entirety by reference.

TECHNICAL FIELD OF THE INVENTION

The present invention relates to unmanned lighter-than-air platforms operating in the stratosphere and more particularly, their termination and recovery.

BACKGROUND OF THE INVENTION

Unmanned lighter-than-air ballooncraft have been used for many years to perform tasks such as near space research, and meteorological measurements. Such ballooncraft have even carried payloads with instrumentation that sometimes includes radio transmission capabilities.

SUMMARY OF THE INVENTION

Innovative new methods in connection with lighter-than-air free floating platforms, of facilitating legal transmitter operation, platform flight termination when appropriate, environmentally acceptable landing and recovery of these devices are provided. Especially, termination of radio transmissions and flight related to regional, governmental and international border requirements, regulations and laws. The present invention provides methods comprising specific criteria, detection of the criteria and elements of operation for reducing or preventing illegal transmissions, for producing rapid descend to the ground, for environmentally acceptable landing and for facilitating recovery all with improved safety and enhanced compliance with known regulations.

BRIEF DESCRIPTION OF THE DRAWINGS

A better understanding of the invention may be had with reference to the attached drawing Figures in connection with the Detailed Description below in which like numerals represent like elements and in which.

DETAILED DESCRIPTION OF THE INVENTION

It has been found that the previous largest use of unmanned lighter-than-air ballooncraft has been by the various weather services of the world. For weather data acquisition purposes small latex weather balloons carry instrument packages called radiosondes to gather the weather data. These weather balloons are launched from a network of sites around the world at noon and midnight Greenwich Mean Time each day. The weather service radiosondes collect temperature, humidity, pressure and wind data as they rise from the surface of the Earth to approximately 100,000 feet during a two-hour flight comprising ascent and rapid descent. At approximately 100,000 feet the weather balloons burst and the radiosonde payload falls to earth on a parachute. This data acquire during the ascent is input into atmospheric models run on supercomputers to facilitate predicting the weather. The input data is limited as it represents only a snapshot of the weather data taken during the balloon ascent every 12 hours. The ascent and decent is rapid, mostly within country borders. Also, most countries of the world are bound by treaty to launch balloon carried radiosondes from designated sites and to share the data with other countries such that short duration radio transmissions and physically crossing borders is not any major issue.

Currently there are about 800,000 radiosondes launched each year throughout the world. There are also a small number of radiosondes launched for military and research purposes. The research balloons typically are done using special frequencies and with international or individual country permission for border crossing. The total number primarily represents the 997 global weather stations launching two radiosondes per day, 365 days per year (727,000). Only about 18% of these radiosondes are recovered, reconditioned and reclaimed, resulting in the new production of about 650,000 weather-gathering radiosondes per year.

The Federal Communications Commission (FCC) prohibits uncontrolled transmitters as they may cause interference to users on the same frequency or others on nearby frequencies. FCC spectrum licenses prohibit a US licensed transmitter from transmitting when it leaves the border of the US.

It has been found that most lighter-than-air platforms that maintain altitude drop ballast to maintain altitude as lifting gas is lost through the balloon membrane that floats the platform. The Federal Aviation Administration (FAA) regulations Section 101.7 states that unmanned ballooncraft are prohibited from dropping objects or operation such that a hazard may occur.

Sec. 101.7 Hazardous operations.

(a) No person may operate any moored balloon, kite, unmanned rocket, or unmanned free balloon in a manner that creates a hazard to other persons, or their property.

(b) No person operating any moored balloon, kite, unmanned rocket, or unmanned free balloon may allow an object to be dropped there from, if such action creates a hazard to other persons or their property.

(Sec. 6(c), Department of Transportation Act (49 U.S.C. 1655(c))

[Doc. No. 12800, Arndt. 101-4, 39 FR 22252, Jun. 21, 1974]

A major factor influencing the size and cost of a lighter-than-air platform is the weight of the payload. For small ballooncraft such as weather balloons, they may become exempt from certain FAA reporting, lighting, and launching requirements if the total payload weight is kept below 6 pounds and a density of 3 ounces or less per square inch of the smallest side.

Sec.101.1 (4)Applicability.

(a) This part prescribes rules governing the operation in the United States, of the following:

(4) Except as provided for in Sec. 101.7, any unmanned free balloon that—

(i) Carries a payload package that weighs more than four pounds and has a weight/size ratio of more than three ounces per square inch on any surface of the package, determined by dividing the total weight in ounces of the payload package by the area in square inches of its smallest surface;

(ii) Carries a payload package that weighs more than six pounds;

[Doc. No. 1580,28 FR 6721, Jun. 29, 1963, as amended by Arndt. 101-1, 29 FR 46, Jan. 3, 1964; Arndt. 101-3, 35 FR 8213, May 26, 1970]

The unique use of a low-density payload also significantly reduces costs associated with the launch and allows a launch to occur in all weather conditions. The amount of ballast required to keep a platform within a set altitude range over a 24-hour period is typically on the order of 15% of the total system weight. This is a significant percentage of the total weight for a floating platform or ballooncraft mission lasting over multiple days. For example, it has been found that a three day flight may require that 38% of the platform's system weight be ballast. This either significantly increases the size of the balloon or decreases the weight available for the payload.

The two sections of the FAA regulations above show the FAA's concern with increased payload weights and increased densities. This appears to focus on reducing the potential for damage to an aircraft in a collision. The density and total weight of the payload are also found to be significant factors in overall safety upon the payload's return to the earth. Generally lower weight and density payloads, are believed to reduced chances of causing physical damage, and as a beneficial result may also be easier and less costly to insure as well.

The FAA further prohibits uncontrolled lighter-than-air balloons. Again there may be a concern that uncontrolled flight may present a hazard to aircraft. For example, in 1998, a large uncontrolled scientific balloon launched by the Canadian Space Agency prompted re-routing of trans-Atlantic passenger flights for 10 days as it drifted from its launch site in Canada until it finally landed in Finland. The uncontrolled balloon also resulted in aviation concerns in Russia and Norway. Significant resources were expended, including the use of fighter jets to try to bring the uncontrolled balloon down.

Until now, unmanned, free drifting, lighter-than-air balloons have been either restricted to short flights as is the case with the 50,000 NWS weather balloons launched each year, or a very few large and expensive long duration scientific flights. The NWS weather balloons have an extremely limited life (approximately 2 hours) and their transmitters and batteries have limited power. The long duration scientific balloons typically have long lives and extended missions. These infrequent ballooncraft flights are expensive and generally require frequency and safety coordination with each country that they overfly. They may gain authorization to use government or scientific frequencies for short periods of time that are not available for commercial users.

Applicants, as disclosed in a co-pending application, have discovered and developed new and commercially viable uses for small free-floating platforms with long duration capabilities. These small, long duration ballooncraft or free floating platforms have long flight lives similar to much larger scientific ballooncraft and the ability to travel long distances. The present methods and inventive devices facilitate avoiding the massive reporting and coordination requirements of the larger ballooncraft. The free-floating platforms may be operating on commercial frequencies that have specific laws as to the use of the frequencies in each country. The innovative new methods facilitate maintenance of legal transmitter operations, particularly at borders, they provide for platform flight termination for rogue, uncontrolled or malfunctioning platforms, they provide for environmentally acceptable descent and they enhance the opportunity for recovery and reuse of these devices. All of these methods are especially useful as they relate to regional and international borders. The present invention uses specific criteria and elements of operation or sets of criteria and elements of operation that taken as a whole form a safe method for reducing or preventing illegal transmissions, for terminating flight, for rapidly descending the platform to the ground, for environmentally acceptable landing and for enhanced recovery. All the methods are designed to enhance safety and to comply with known regulations.

Figure 1:
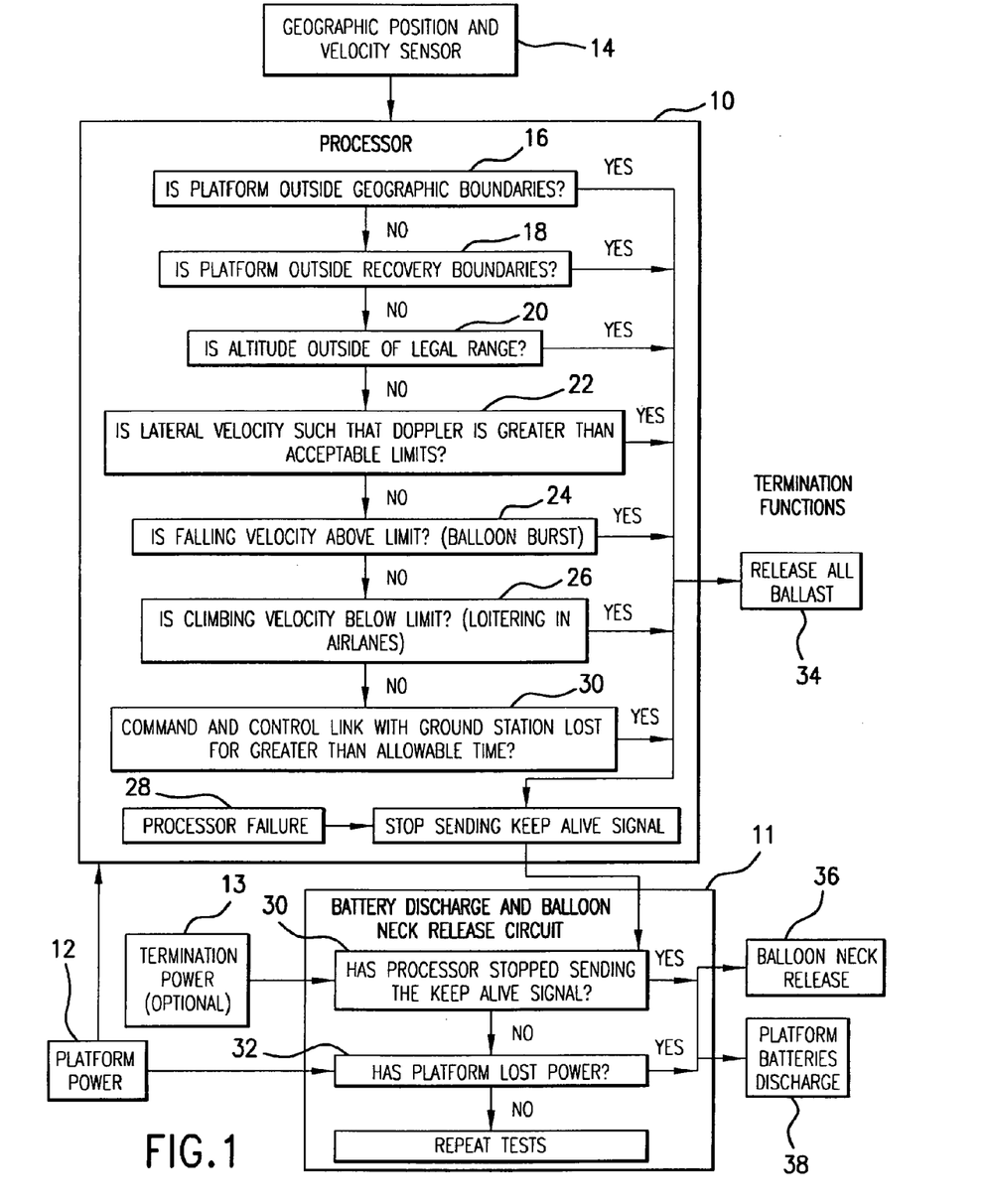
FIG. 1 schematically depicts a flow diagram of combined methods of a termination decision by a processor including termination criteria, criteria detection by sensing of geographic position and velocity and elements of operation according to certain aspects of the invention.

FIG. 1 schematically depicts a flow diagram of combined methods of a termination decision by a processor including termination criteria, criteria detection by sensing of geographic position and velocity, and elements of operation according to certain aspects of the invention. In combination with an onboard power source 12 and GPS 14 (or other geographic locator or tracking system), a processor 10 is provided to receive position information and time change of position (velocity) information 14. The position information is compared to stored or programmed criteria information at 16, 18, 20, 22, 24, 26, 28 and 30, to determine whether termination of radio transmission and/or termination of flight should be implemented.

The following criteria based decisions are provided with the processor 10: Has the platform moved or drifted outside of a certain geographic area? (See FIG. 1, at 16.)

The relevant boundaries may be frequency license borders set by the FCC as dictated by a regional or nationwide broadcasting license. The FCC prohibits transmitter operation outside such geographic borders. Additionally, a neighboring country may have restrictions on transmitted power into their country from a United States transmitter. It has been found that on certain frequencies Mexico prohibits transmit power levels above −99 dBm into Mexico from the United States. These restrictions are not hard for terrestrial towers as they can use directional antennas once during installation and not have to adjust them again thereafter. This is quite different for a free drifting high altitude ballooncraft as the position and altitude may be constantly changing and may require the platform to stop transmitting while still inside the United States, but within a protective number of miles of the United States-Mexico border. Long duration scientific ballooncraft are not as concerned with this as they typically work on special frequencies or have coordinated with other countries that may be over flown.

Is the platform moving outside of boundaries that would significantly reduce the probability of recovering the platform? (See FIG. 1 at 18.)

As payloads costs may be significant, from $50 to $150 for a typical weather service radiosonde, up to hundreds of dollars for a transceiver platform, and up to many tens of thousands of dollars for a scientific payload, recovery is important both financially and for environmental reasons. A platform may encounter strong winds especially in the jet stream as it descends from high altitudes. In order to keep the platform from drifting out of the country on descent, artificial borders that take into account the winds during descent can be used. Also, boundaries of large bodies of water such as the great lakes, seas and oceans the crossing of which might hamper or prevent recovery of the platform upon normal decent, may be taken into account for termination of flight purposes.

Has the platform fallen below or risen above a set altitude range? (See FIG. 1 at 20)

Most scientific and weather balloons reach altitudes above 60,000 feet, The FAA regulates airspace below 60,000 feet and discourages free floating craft or uncontrolled flight craft from loitering especially in commercial air lanes as they present a hazard to commercial planes. Current NWS weather balloons do not have the capability to terminate the flight if they start to hover below 60,000 feet. Even the large-scale scientific balloons may become errant and free drift below 60,000 feet. (see the rogue scientific balloon example listed earlier). There is a strong need for a ballooncraft to terminate it's flight if it is not in the proper altitude range.

Is the platform velocity sufficient to create an unacceptably large Doppler shift in the transmission frequency? (See FIG. 1, at 22)

A ballooncraft traveling in the jet stream may reach speeds of over 180 miles per hour. This creates a Doppler shift in the frequencies received on the ground. The FCC regulates the amount of total frequency drift allowed on a commercial transmission. Doppler shift contributes to this total frequency drift and if great enough can cause the transmitter to transmit out of its allowed band. These requirements have not been considered or accounted for in the past as free drifting commercially transmitting platforms were not available. Therefore, the requirement that the payload be able to immediately stop transmitting past the speed at which the Doppler becomes too great is new.

Does the platform fall rate indicate a balloon burst? (See FIG. 1, at 24.)

A fast fall rate indicates that the balloon has burst and that the craft is falling. The transmission of radio signals should be terminated and the other termination actions should be promptly initiated.

Is the lighter-than-air platform rising too slow? (See FIG. 1, at 26.)

This indicates that the balloon is under-filled or leaking. A slow rise rate may present a danger to aircraft by loitering excessively at one altitude particularly at an altitude in designated air lanes.

Has the processor, the position finding equipment, or the primary power failed? (See FIG. 1, at 28.)

A GPS, star tracker, or system power failure will cause an on-board termination. The platform must be able to terminate without processor control or power.

Have command and control communications been lost? (See FIG. 1, at 30.) Without command and control from the ground, the payload should cease transmission and the flight must should be terminate.

The present inventive system detects the foregoing conditions by comparing current position, velocity, and operating conditions to stored, programmed or calculated criteria using an onboard processor. The present invention utilizes a GPS unit and a processor to determine the current platform's geographic coordinates and velocities. A GPS unit or pressure sensor determines the platform altitude. The processor algorithms will implement the complete set of conditions listed above causing the ballast to be released at 34, the transmitter to be shut off at 38 and the flight terminated at 36 upon detection of a stored, programmed or calculated termination criteria. Under conditions of a power loss or processor failure, the transmitter will also be shut off at 38, and the flight will be terminated at 36. The methods and mechanisms for the termination actions are described more fully below.

A separate termination controller 11 under separate power 13 monitors the primary platform power at 32 and monitors processor functions at 30 to determine if the processor 10 is functioning properly. Both the primary processor 10 and the separate termination controller 11 have the ability to terminate transmissions, by discharging the primary platform batteries at 38 and to terminate the flight by releasing the balloon at 36. The separate power source 13 may advantageously comprise a very small environmentally acceptable battery such as an alkaline watch battery.

The present invention solves certain past needs. This invention describes a system, method and design for use with lighter-than-air platforms that overcomes certain safety drawbacks of conventional unmanned lighter-than-air ballooncraft. The processor reduces or eliminates the chance of the platform becoming a free floating, uncontrolled transmitter by monitoring sensed coordinates and platform velocities (GPS, star tracker, etc) and by comparing the sensed information to known (stored, programmed or calculated) geographic or altitude based boundaries. If the processor determines that the platform is out of its proper boundaries, termination is started. If the GPS fails, the processor also initiates termination. If the processor function unacceptably fails or if the primary power fails, termination and recovery is also automatically initiated with a secondary termination control circuit having its own small and environmentally acceptable power source. This does not require power from the primary power source of the platform.

Figure 2:
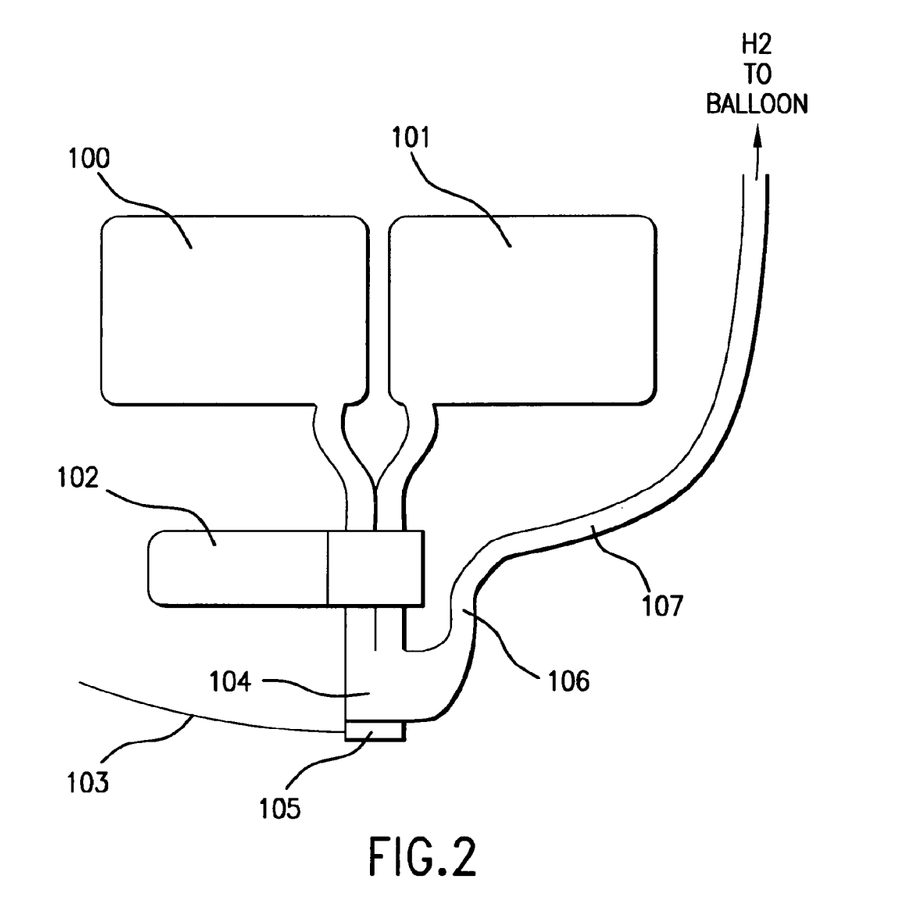
FIG. 2 schematically depict a mechanism for providing and for releasing ballast according to certain aspects of the present invention.

Termination and recovery comprise several steps or actions as follows:

Releasing all ballast to reduce the payload density and weight. At termination, all ballast is released automatically according to a mechanism as schematically depicted in FIG. 2. Ballast system and release mechanism Both reactant A in Chamber A (100) and reactant B in Chamber B (101) is metered into the reaction chamber (104) where hydrogen generation occurs. The relative size of each of the two chambers is determined by the molar ratio of the reaction. If water is used as one of the reactants and a fuel cell is used on the platform for generating power, the water byproduct of the fuel cell's reaction may be used for the ballast system reaction as one of the reactants. Different metering rates would be required for each reactant if the molar ratio of the reactants were not 1 to 1. This could be done with a dual peristalsis pump (102) if the tubing diameters were adjusted to pump the appropriate amount from each reactant chamber. During the reaction, hydrogen is vented from the reaction chamber through a tube (107) into the balloon. A one-way valve (106) in the tube to the balloon prevents hydrogen from flowing back into the reaction chamber. After the reaction is complete, the byproduct is dropped as ballast from the bottom of the reaction chamber (104) through an electrically actuated valve (105). The valve (105) is then closed. Unless the balloon has burst, upon flight termination, the reactants will be reacted as quickly as safely possible in the reaction chamber (104) and the byproducts dropped as ballast. If the balloon has burst, the pumps may not be to pump as effectively from the chambers unless the chambers have a slight pressure and no air is allowed in them.

In a second configuration (not depicted), the ballast system comprises two cavities each containing one of the two reactants. The reactant in the top cavity is metered into the lower cavity where the hydrogen generation occurs. The reaction byproducts are only released as ballast when all of the original reactants are depleted.

This makes the payload lighter and therefore safer in the event of collision with aircraft or persons and property on the ground. While any acceptable ballast could be released, the novel ballast system described above effectively reduces the actual weight of ballast required by a system thereby increasing the safety of the payload. In the novel ballast system the total amount of ballast carried to provide long duration flight at an acceptable altitude is significantly reduced. Reducing the amount of ballast should in most cases increase safety. In one specific example, the system uses water and either Sodium Hydride or Calcium Hydride as the ballast. When additional altitude is required, a quantity of water is added to a quantity of Sodium Hydride or Calcium Hydride. A large volume of hydrogen gas is generated. This hydrogen is added to the lifting balloon and the byproducts of the reaction are dropped as ballast. The platform becomes lighter due to the dropping of the Ca(OH)2 or Na(OH)2 byproduct and at the same time, hydrogen is added to the balloon increasing lift. Only 73% (75% for Sodium Hydride) of an equivalent weight of inert ballast such as sand is needed. As ballast can be a significant portion of the initial total weight, reducing the weight of the ballast significantly reduces the total weight of the payload.

Releasing the neck of the balloon from the platform to initiate a quick descent.

This makes sure the platform descends quickly through the atmosphere thereby reducing the potential time through the commercial air lanes. Small balloon systems such as the NWS weather balloons rely on the balloon bursting due to expansion as it rises through the atmosphere. A hovering balloon does not experience this expansion and therefore must either have a system to burst the balloon or physically separate from the balloon. Venting the balloon is generally not acceptable because of the danger of the balloon drifting laterally on the ground increases the chance of personal or property damage. A further problem would occur if hydrogen was used as the lifting gas. This could create a possibility of hydrogen remaining in the balloon after landing and becoming a potential ignition source. Bursting the balloon is also less desirable as the burst balloon still attached to the payload may foul the descent mechanism causing an uncontrolled descent. In the invention, the neck of the ballooncraft is released when power is lost or the processor fails.

Figure 3:
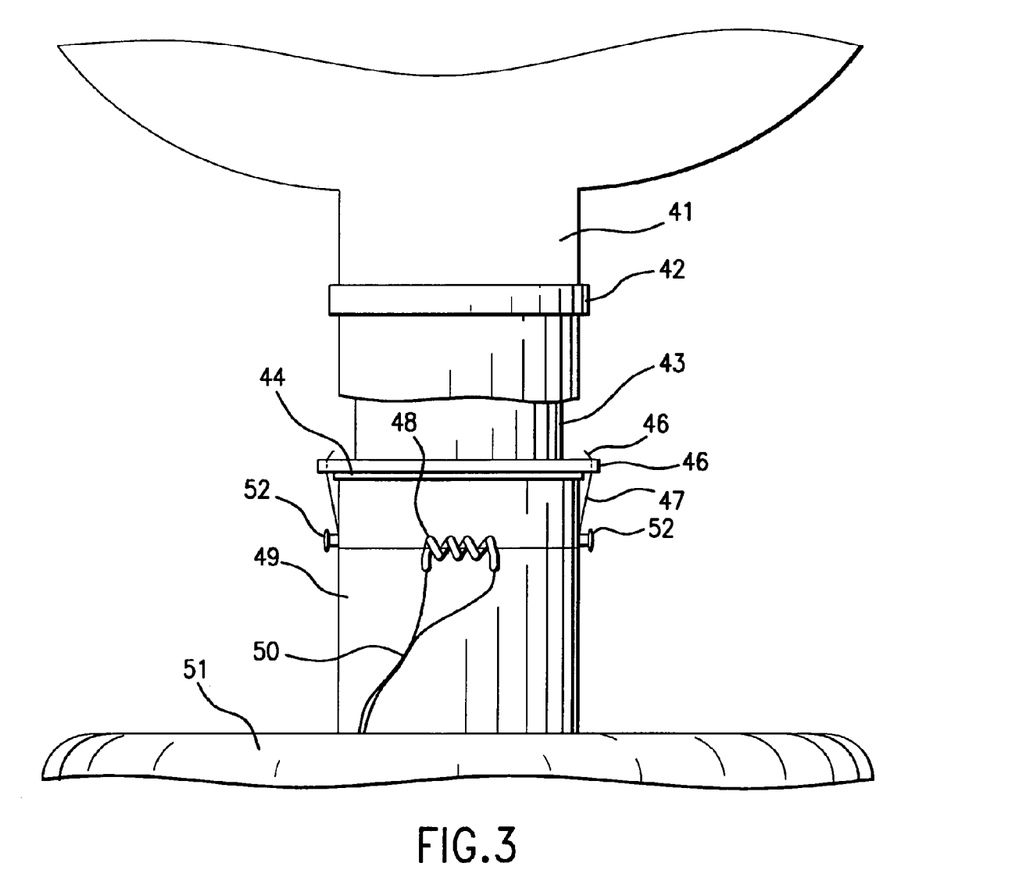
FIG. 3 is a schematic partial front view of a neck of a platform connecting between a balloon and a payload and depicting the construction and method of releasing a balloon from the payload platform.
Figure 4:
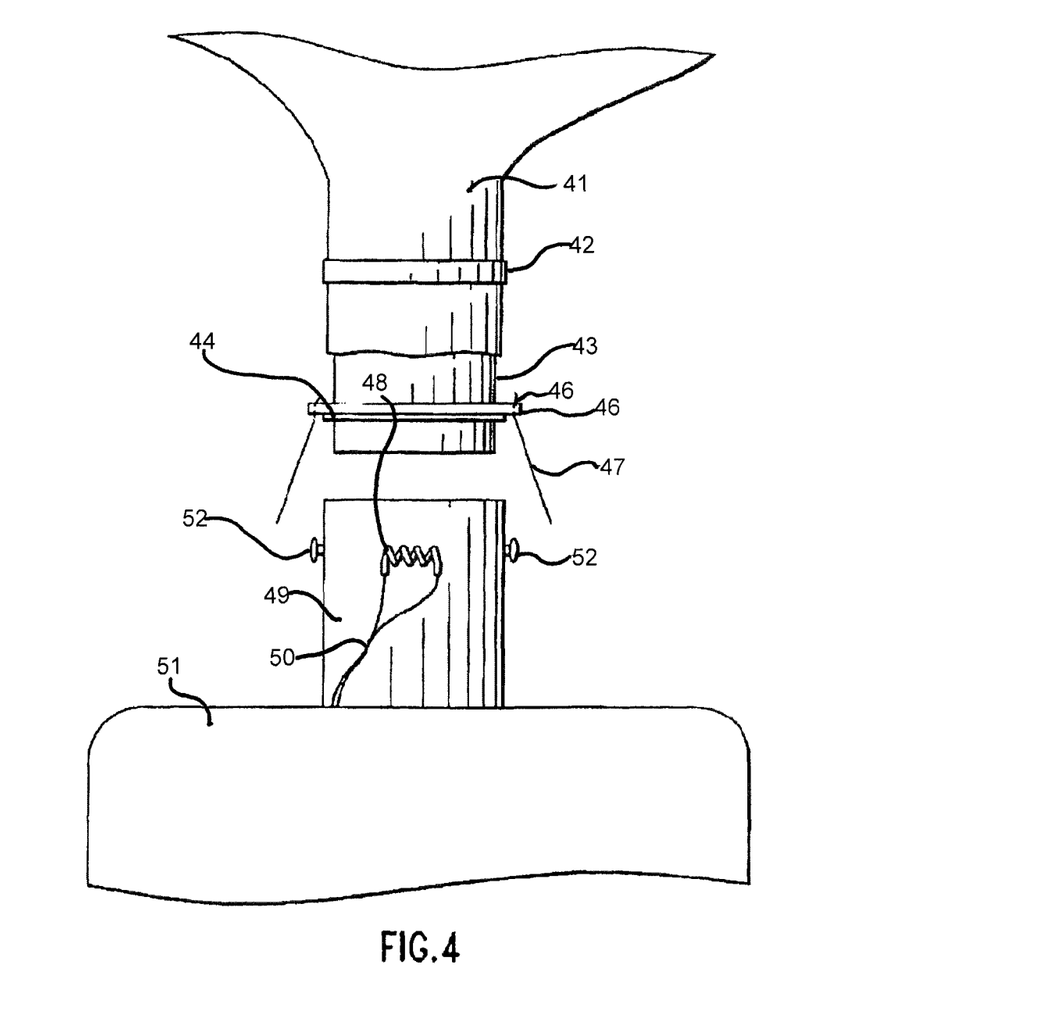
FIG. 4 is a schematic partial front view of the neck of a platform connecting between a balloon and a payload as in FIG. 3 further depicting the release of the balloon from the payload platform.

One possible implementation of the neck release mechanism as depicted schematically in FIGS. 3 and 4, comprises two concentric neck connection tubes (43) and (49). The top tube (43) is attached to the balloon (41) with a strap (42) or rubber band (42) and fits within the bottom tube (49), which is attached to the payload (51). The top tube (43) is restrained from sliding out of the bottom tube (49) by a piece of monofilament line (47). While top tube (43) and bottom tube (49) are restrained to each other, flexible seal (44) prevents gas in the tubes from leaking at the junction of the tubes. Each end of the monofilament line (47) is threaded through a small hole in flange (46) and tied off. The monofilament line (47) is threaded around two knobs (52) and also through and in contact with an electrically resistive coil (48).

When thermination of the flight is called for, the ballast is preferably released first and then a discharge circuit passes current through the resistive coil (48). The coil heats (48) up and melts through the monofilament line (47). The weight of the payload (51) now pulls the bottom tube (49) from the top tube and the payload is released from top tube (43). and thus from the balloon (41). This ballast system advantageously allows for the venting of the lifting gas directly at the payload eliminating the need for wiring to remote valves. Integration of the actuator electronics simplifies the design and ultimately the reliability of the platform.

Figure 5:
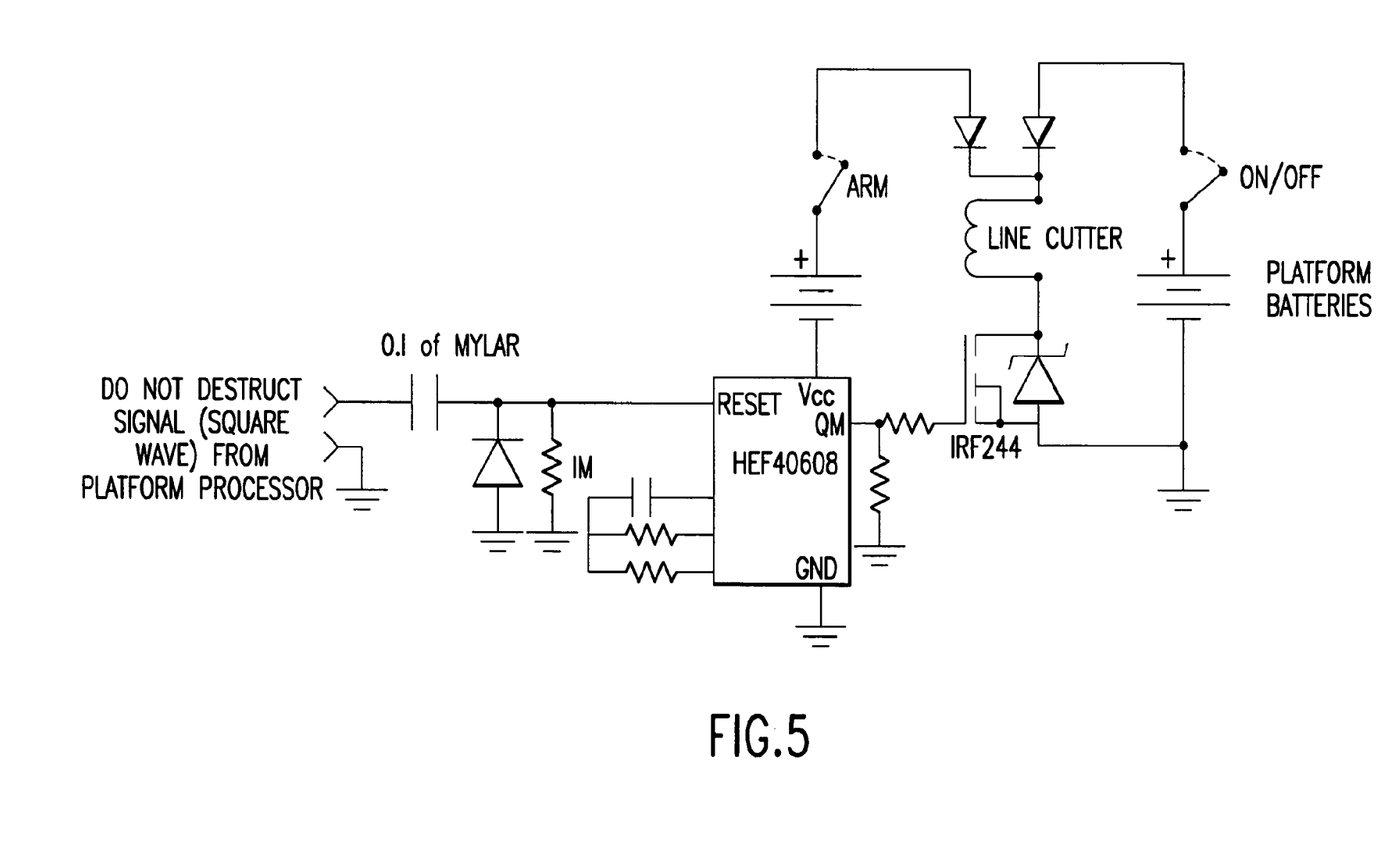
FIG. 5 is a schematic diagram for a battery discharge and neck release circuit.

The battery discharge and neck release circuit is schematically depicted in FIG. 5. The processor must constantly supply a keep alive signal to the battery discharge circuit in order to prevent the batteries from discharging. This keep alive signal consists of a square wave. The battery discharge circuit senses the low to high transitions in the keep alive signal and resets the timer (a HEF 4060) each time the transition is detected. The timer must be reset by the presence of the keep alive square wave or the timer will end it's counting and initiate the battery discharge. A high power FET closes the circuit that discharges the batteries. In one implementation of the discharge circuit, the power from the discharge circuit comes from the main batteries themselves. Because the discharge circuitry can function down to extremely low battery voltages, the batteries are effectively discharged by the time the discharge circuit is unable to function.

An alternate implementation uses a separate, non-hazardous, small battery to operate the discharge circuitry. This implementation ensures that the main batteries are completely discharged. The discharge circuit dissipates power through the resistive wire that during battery discharge, dissipates the energy as heat. The resistive wire is wrapped around a piece of monofilament (fishing) line. When the battery power is dissipated through the resistive wire, the monofilament line is melted through and the neck connecting the balloon to the platform is released from the payload. Another advantage of providing a separate power source for the discharge circuit is that the discharge circuit battery will supply the resistive element with power to cut the monofilament line even if the main batteries are dead. As an alternative, the discharge circuit could dissipate power through a high power resistor if the neck release function were not used.

If the processor senses any of the conditions necessary to initiate termination, it ceases sending the keep alive signal to the discharge circuit. If the processor dies or the power fails, the keep alive signal also ceases, causing termination. The timer advances to a point where it initiates the battery discharge. Battery current flows through the resistive wire discharging the batteries and melting through the monofilament to release the balloon neck. The battery discharge continues until the main batteries are completely dead.

The main platform batteries are fully discharged during descent and if needed upon landing to positively terminate and prevent further radio transmission. Once discharge is initiated, the batteries fully discharge eliminating the chance of transmitting with significant power. The battery discharge can be initiated by the processor as described above or automatically when power or processor control is lost. It has been found that long duration platform flight at high altitudes and cold temperatures requires special high-density power and functional capabilities at low temperatures. It has been found that lithium batteries beneficially fulfill such requirements. Additionally, it was found that the Environmental Protection Agency (EPA) states that lithium based batteries are considered hazardous waste except for one type of cell and only when fully discharged. Particularly it has been found that Lithium Sulfur Dioxide (LiSO2) batteries, when fully discharged, form a lithium salt, which is not considered hazardous by the EPA. Automatically discharging the LiSO2 batteries before they contact the ground not only prevents the transmitter from transmitting but also renders the batteries non-hazardous for environmentally acceptable landing on the ground.

Figure 6:
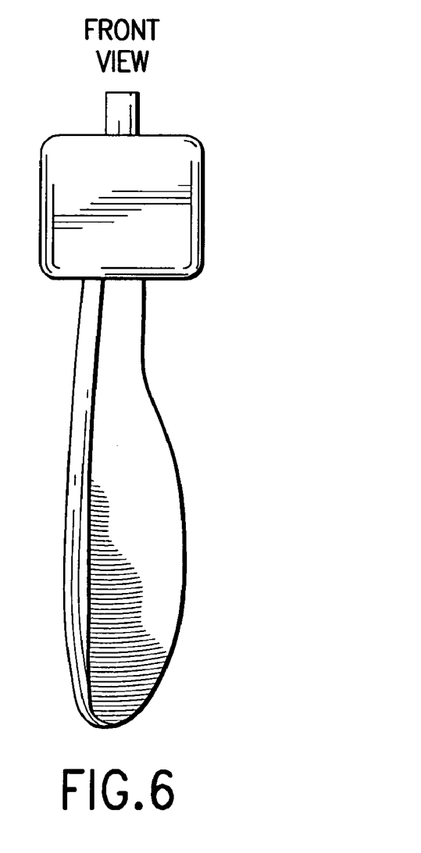
FIGS. 6, 7 and 8 are front side and end views, respectively, of a "maple seed" descent mechanism attached to the bottom of a platform according to one embodiment of certain aspects of the invention.
Figure 7:
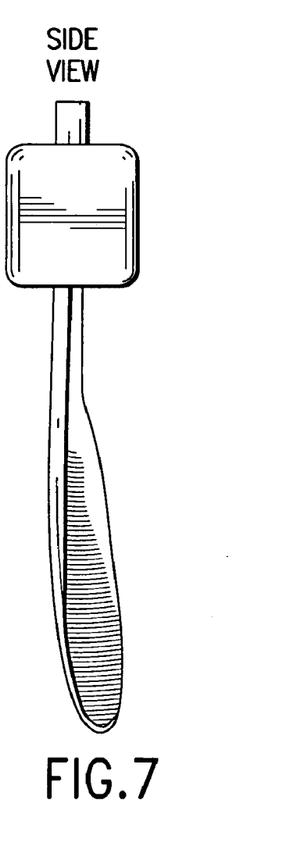
Figure 8:
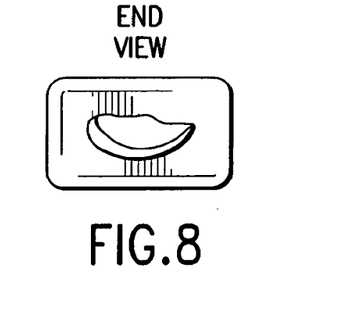

Use of a novel and integral "maple seed" like descent device to increase safety is depicted in FIGS. 6, 7 and 8. A single airfoil shaped blade attached to the bottom of the platform causes autorotation of the payload and airfoil blade upon rapid descent. This replaces a traditional parachute with a highly reliable decelerator that is generally immune to fouling than a parachute and less complex. No deployment mechanism is necessary and it is immune to the fouling problems with animals after descent. The "maple seed" decelerator may also be used to conveniently house the platform antenna.

Figure 9:
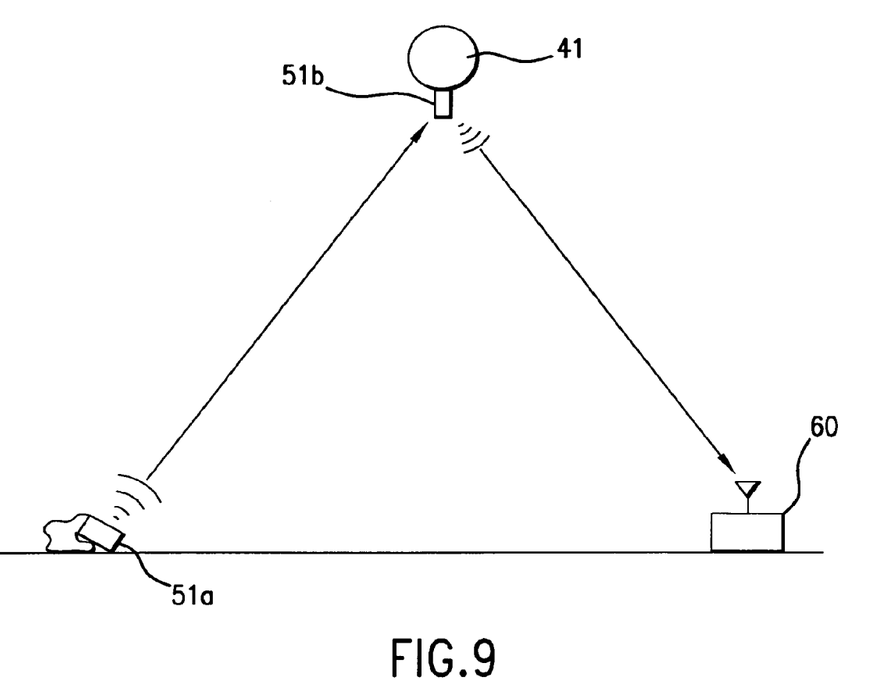
FIG. 9 is a schematic depiction of a landed terminated platform (without balloon) transmitting a locator signal to a floating platform transceiver that relays the locator information to a ground station to facilitate recovery of the terminated platform.

A novel method of platform recovery is depicted in FIG. 9. To aid in the recovery of the platform, the landed platform sends its last recorded position to an additional airborne platform using a low power transmitter and tiny battery. The transmitter might utilize one of the low power unlicensed bands to send the information. The second platform relays the current location of the landed platform to the ground station to aid in recovery.

What is claimed is:

1. A system comprising a plurality of airborne platforms, each airborne platform comprising an unmanned balloon; a payload that is separate from the unmanned balloon; a transceiver; a flight termination device; at least two separate power sources for the flight termination device; a sensor; a processor; a pump; and a valve;
   wherein the pump and the valve are configured to change an altitude of the airborne platform;
   wherein the sensor comprises a pressure sensor;
   wherein, in operation, the unmanned balloon substantially drifts along with the wind currents;
   wherein the transceiver is capable of communicating with a communication device that is separate from the unmanned balloon;
   wherein the flight termination device has an ability to terminate a flight of the unmanned balloon;
   wherein at least one of the geographical coordinates tracking system comprises a GPS;
   wherein the unmanned balloon is configured to operate above an attitude of about 60,000 feet;
   wherein the unmanned balloon has a flight duration capability that is longer than that of weather balloons that have flight durations of approximately 2 hours;
   wherein the payload is configured to communicate with an additional airborne payload attached to a separate unmanned balloon.

2. The system of claim 1, the system further comprising an antenna and at least two geographical coordinates tracking system.

3. The system of claim 1, wherein the payload remains attached to the unmanned balloon as one when landed unless the payload is separated from the unmanned balloon.

4. The system of claim 1, wherein the unmanned balloon substantially drifts along with the wind currents taking into account the wind currents.

5. The system of claim 1, wherein the unmanned balloon substantially drifts along with the wind currents taking into account the wind currents to prevent the airborne platform from becoming an uncontrolled lighter-than-air airborne platform.

6. A system comprising a plurality of airborne platforms, each airborne platform comprising an unmanned balloon; a payload that is separate from the unmanned balloon; a transceiver; a flight termination device; at least two separate power sources; a sensor; a processor; a pump; and a valve; and an object that when broken separates the unmanned balloon and the payload;
   wherein the pump and the valve are configured to change an altitude of the airborne platform;
   wherein the flight termination device has an ability to terminate a flight of the unmanned balloon;
   wherein at least one of the geographical coordinates tracking system comprises a GPS;
   wherein the unmanned balloon is configured to operate above an attitude of about 60,000 feet;
   wherein the unmanned balloon has a flight duration capability that is longer than that of weather balloons that have flight durations of approximately 2 hours;
   wherein the flight termination device has an ability to terminate a flight of the unmanned balloon based on a determination that further operation of the unmanned balloon presents a danger to air traffic; and
   wherein the flight termination device has an ability to terminate a flight of the unmanned balloon based on a determination of a malfunction of the unmanned balloon.

7. The system of claim 6, the system further comprising an antenna and at least two geographical coordinates tracking system wherein the sensor comprises a pressure sensor; wherein the at least two separate power sources are for powering the flight termination device; wherein, in operation, the unmanned balloon substantially drifts along with the wind currents; wherein the payload remains attached to the unmanned balloon as one when landed unless the payload is separated from the unmanned balloon; wherein the transceiver is capable of communicating with a communication device that is separate from the unmanned balloon.

8. The system of claim 6, wherein the airborne platform is configured to reduce or eliminate a chance of the airborne platform becoming a free floating, uncontrolled transmitter.

9. The system of claim 8, wherein the airborne platform is configured to reduce or eliminate a chance of the airborne platform becoming a free floating, uncontrolled transmitter by monitoring sensed information of the airborne platform and by comparing the sensed information to known geographic or altitude based boundaries.

10. The system of claim 9, wherein the sensed information comprises coordinates and velocities.

11. The system of claim 6, wherein the object comprises a line.

12. The system of claim 6, wherein the payload is configured to communicate with an additional airborne payload attached to a separate unmanned balloon.

13. The system of claim 6, wherein the unmanned balloon substantially drifts along with the wind currents taking into account the wind currents.

14. The system of claim 6, wherein the unmanned balloon substantially drifts along with the wind currents taking into account the wind currents to prevent the airborne platform from becoming an uncontrolled lighter-than-air airborne platform.

15. A method comprising operating a system, the system comprising:
 a plurality of airborne platforms, each airborne platform comprising an unmanned balloon; a payload that is separate from the unmanned balloon; a transceiver; a flight termination device; at least two separate power sources for the flight termination device; a sensor; a processor; a pump; and a valve;
 wherein the pump and the valve are configured to change an altitude of the airborne platform;
 wherein the sensor comprises a pressure sensor;
 wherein, in operation, the unmanned balloon substantially drifts along with the wind currents;
 wherein the transceiver is capable of communicating with a communication device that is separate from the unmanned balloon;
 wherein the flight termination device has an ability to terminate a flight of the unmanned balloon;
 wherein at least one of the geographical coordinates tracking system comprises a GPS;
 wherein the unmanned balloon is configured to operate above an attitude of about 60,000 feet;
 wherein the unmanned balloon has a flight duration capability that is longer than that of weather balloons that have flight durations of approximately 2 hours;
 wherein the payload is configured to communicate with an additional airborne payload attached to a separate unmanned balloon; and
 transmitting data from the airborne platform.

16. The method of claim 15, the system further comprising an antenna and at least two geographical coordinates tracking system.

17. The method of claim 15, wherein the payload remains attached to the unmanned balloon as one when landed unless the payload is separated from the unmanned balloon.

18. The method of claim 15, wherein the unmanned balloon substantially drifts along with the wind currents taking into account the wind currents.

19. The method of claim 15, wherein the unmanned balloon substantially drifts along with the wind currents taking into account the wind currents to prevent the airborne platform from becoming an uncontrolled lighter-than-air airborne platform.

20. A method comprising operating a system, the system comprising:
 a plurality of airborne platforms, each airborne platform comprising an unmanned balloon; a payload that is separate from the unmanned balloon; a transceiver; a flight termination device; at least two separate power sources; a sensor; a processor; a pump; and a valve; and
 an object that when broken separates the unmanned balloon and the payload;
 wherein the pump and the valve are configured to change an altitude of the airborne platform;
 wherein the flight termination device has an ability to terminate a flight of the unmanned balloon;
 wherein at least one of the geographical coordinates tracking system comprises a GPS;
 wherein the unmanned balloon is configured to operate above an attitude of about 60,000 feet;
 wherein the unmanned balloon has a flight duration capability that is longer than that of weather balloons that have flight durations of approximately 2 hours;
 wherein the flight termination device has an ability to terminate a flight of the unmanned balloon based on a determination that further operation of the unmanned balloon presents a danger to air traffic; and
 wherein the flight termination device has an ability to terminate a flight of the unmanned balloon based on a determination of a malfunction of the unmanned balloon; and
 transmitting data from the airborne platform.

21. The method of claim 20, the system further comprising an antenna and at least two geographical coordinates tracking system wherein the sensor comprises a pressure sensor; wherein the at least two separate power sources are for powering the flight termination device; wherein, in operation, the unmanned balloon substantially drifts along with the wind currents; wherein the payload remains attached to the unmanned balloon as one when landed unless the payload is separated from the unmanned balloon; wherein the transceiver is capable of communicating with a communication device that is separate from the unmanned balloon.

22. The method of claim 20, wherein the airborne platform is configured to reduce or eliminate a chance of the airborne platform becoming a free floating, uncontrolled transmitter.

23. The method of claim 22, wherein the airborne platform is configured to reduce or eliminate a chance of the airborne platform becoming a free floating, uncontrolled transmitter by monitoring sensed information of the airborne platform and by comparing the sensed information to known geographic or altitude based boundaries.

24. The method of claim 23, wherein the sensed information comprises coordinates and velocities.

25. The method of claim 20, wherein the object comprises a line.

26. The method of claim 20, wherein the payload is configured to communicate with an additional airborne payload attached to a separate unmanned balloon.

27. The method of claim 20, wherein the unmanned balloon substantially drifts along with the wind currents taking into account the wind currents.

28. The method of claim 20, wherein the unmanned balloon substantially drifts along with the wind currents taking into account the wind currents to prevent the airborne platform from becoming an uncontrolled lighter-than-air airborne platform.

* * * * *

UNITED STATES PATENT AND TRADEMARK OFFICE
CERTIFICATE OF CORRECTION

PATENT NO. : 9,658,618 B1
APPLICATION NO. : 15/434036
DATED : May 23, 2017
INVENTOR(S) : Gerald M. Knoblach et al.

Page 1 of 1

It is certified that error appears in the above-identified patent and that said Letters Patent is hereby corrected as shown below:

On the Title Page

On Page 2, Item (60) Related U.S. Application Data (Continued), Line 1-10:

Replace "application No. 14/473,691, filed on Aug. 29, 2014, now Pat. No. 9,519,045, which is a division of application No. 13/757,585, filed on Feb. 1, 2013, now Pat. No. 8,825,232, which is a division of application No. 12/099,004, filed on Apr. 7, 2008, now abandoned, which is a division of application No. 10/673,474, filed on Sep. 30, 2003, now Pat. No. 7,356,390, which is a continuation of application No. 10/129,666, filed as application No. PCT/US02/12228 on Apr. 18, 2002."

With --application No. 14/473,691, filed on Aug. 29, 2014, now Pat. No. 9,519,045, which is a division of application No. 13/757,585, filed on Feb. 1, 2013, now Pat. No. 8,825,232, which is a division of application No. 12/099,004, filed on Apr. 7, 2008, now abandoned, which is a division of application No. 10/673,474, filed on Sep. 30, 2003, now Pat. No. 7,356,390, which is a continuation-in-part of application No. 10/129,666, filed as application No. PCT/US02/12228 on Apr. 18, 2002.--

Signed and Sealed this
Fifth Day of December, 2017

Joseph Matal
*Performing the Functions and Duties of the
Under Secretary of Commerce for Intellectual Property and
Director of the United States Patent and Trademark Office*